No. 672,885. Patented Apr. 30, 1901.
C. L. BERGER.
SURVEYING INSTRUMENT.
(Application filed Mar. 21, 1898.)
(No Model.) 4 Sheets—Sheet 1.
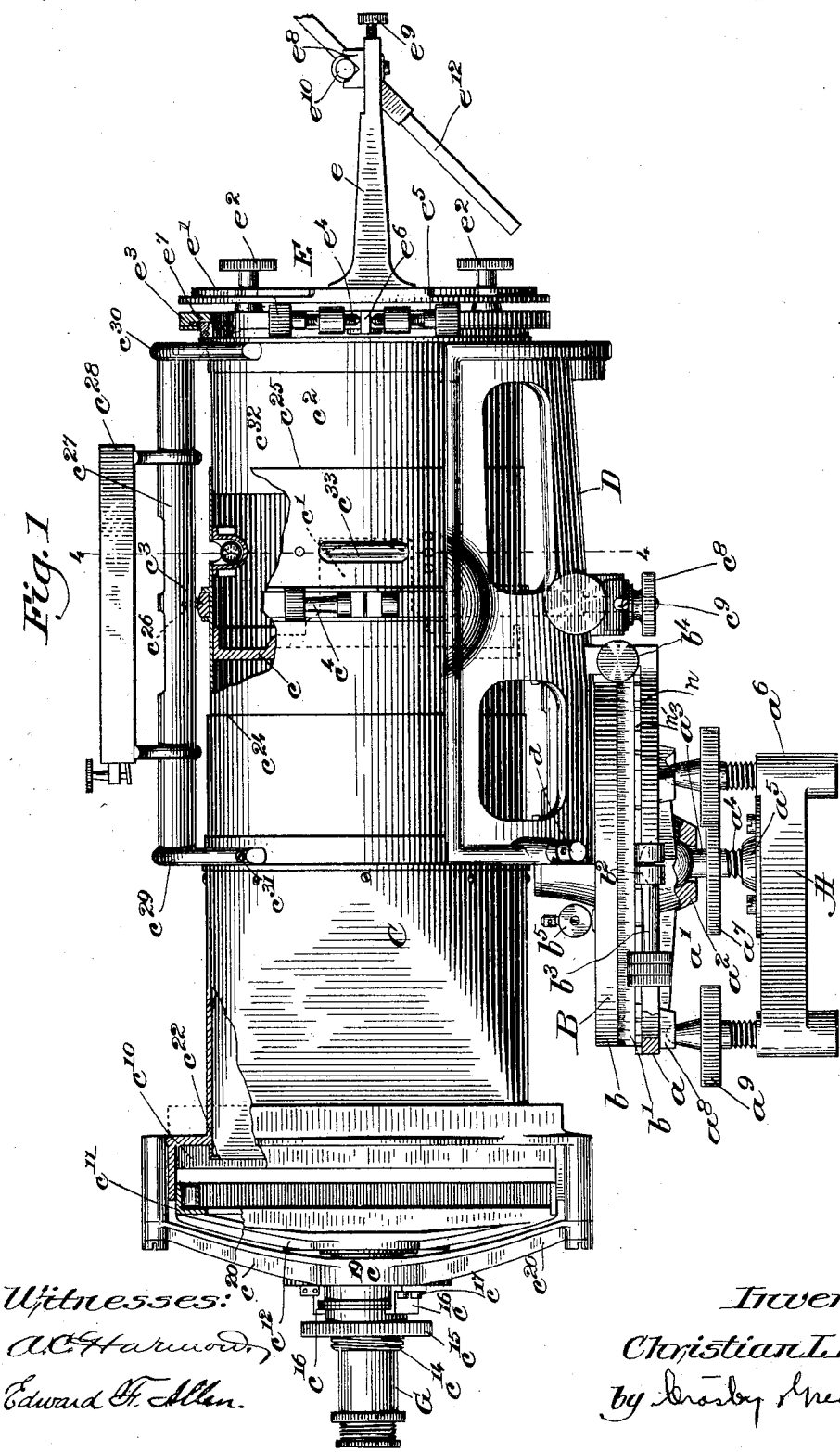

No. 672,885. Patented Apr. 30, 1901.
C. L. BERGER.
SURVEYING INSTRUMENT.
(Application filed Mar. 21, 1898.)
(No Model.) 4 Sheets—Sheet 2.
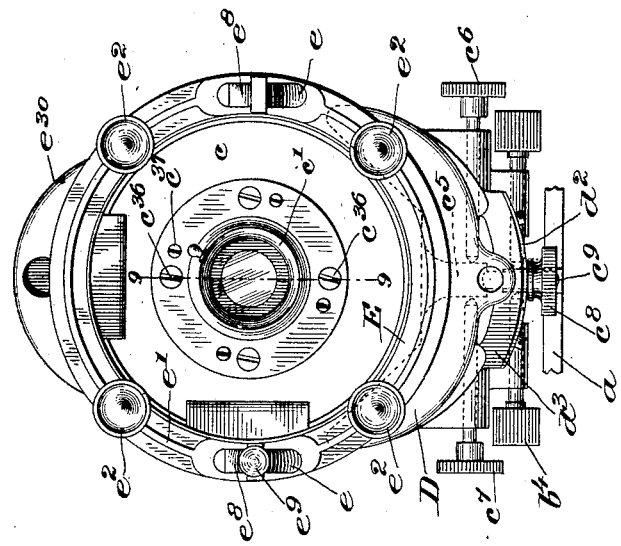
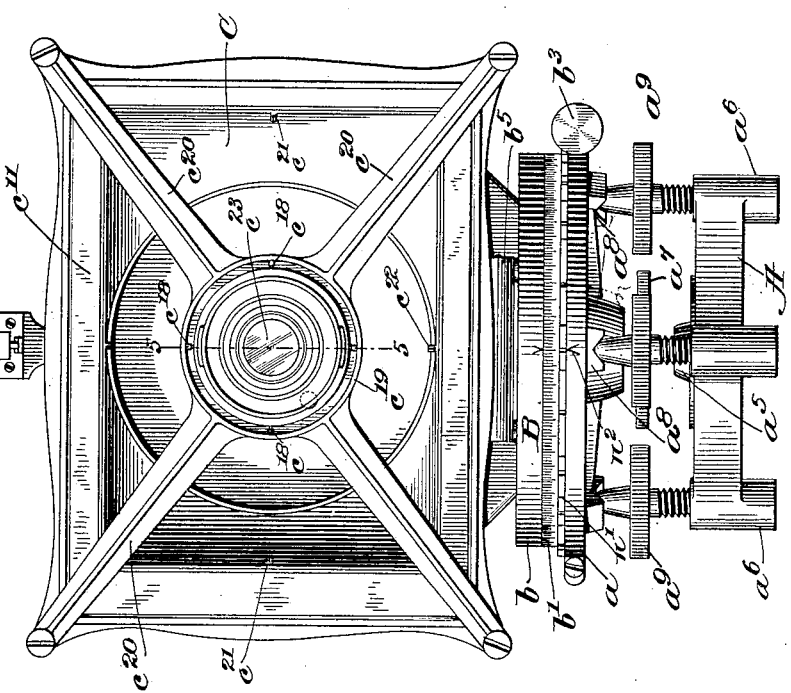
Witnesses:
A. C. Harmon.
Edward F. Allen.
Inventor:
Christian L. Berger.
by Crosby Gregory,
attys.

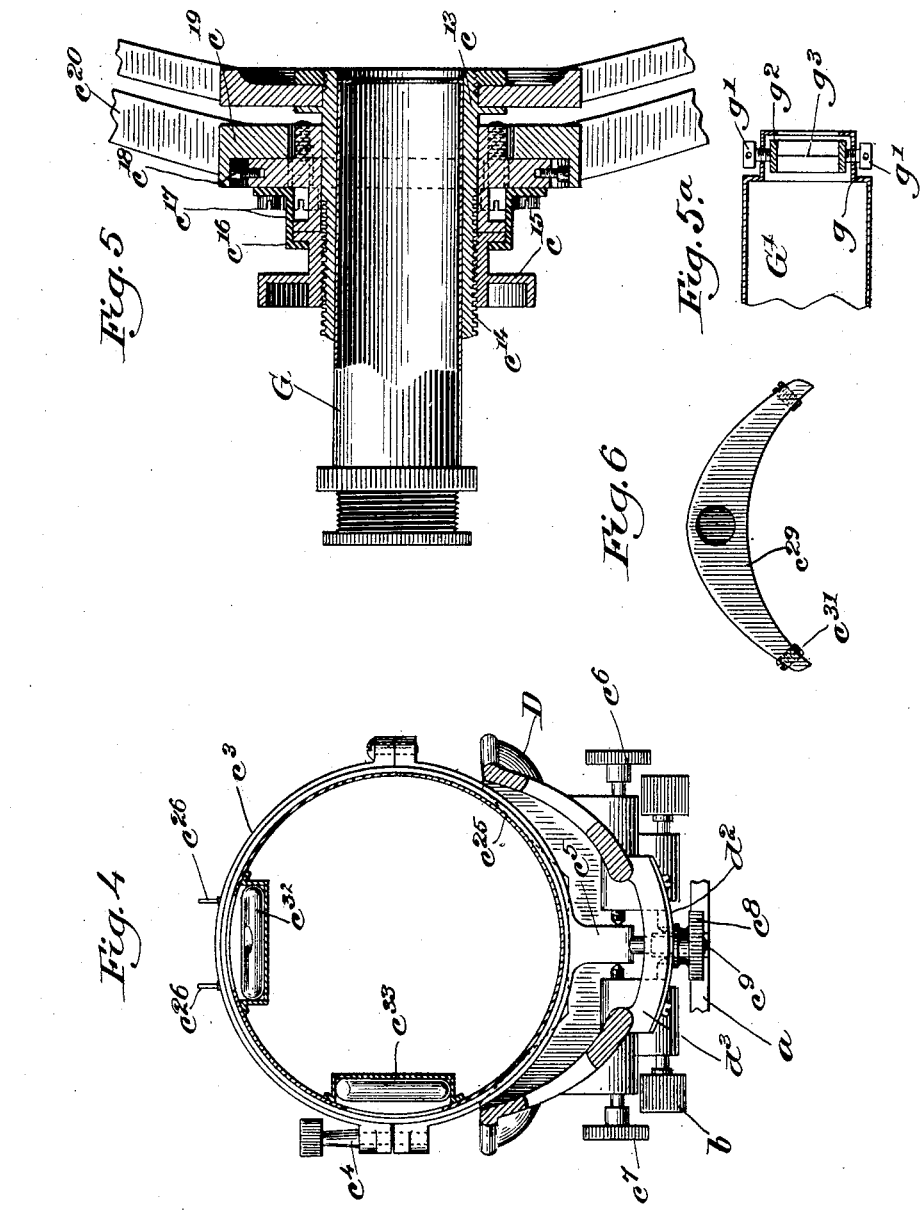

No. 672,885. Patented Apr. 30, 1901.
C. L. BERGER.
SURVEYING INSTRUMENT.
(Application filed Mar. 21, 1898.)
(No Model.) 4 Sheets—Sheet 4.
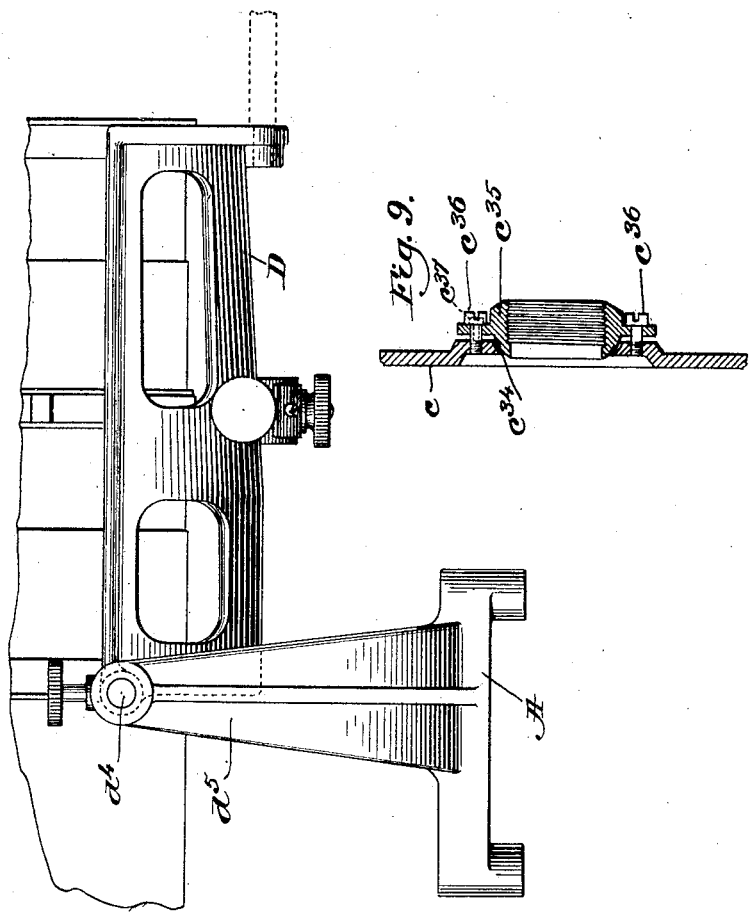
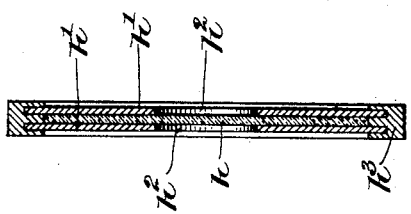
Witnesses:
A. C. Harmon
Edward F. Allen
Inventor:
Christian L. Berger.
by Crosby Gregory.
Attys.

UNITED STATES PATENT OFFICE.

CHRISTIAN L. BERGER, OF BOSTON, MASSACHUSETTS.

SURVEYING INSTRUMENT.

SPECIFICATION forming part of Letters Patent No. 672,885, dated April 30, 1901.

Application filed March 21, 1898. Serial No. 674,572. (No model.)

*To all whom it may concern:*

Be it known that I, CHRISTIAN L. BERGER, of Boston, county of Suffolk, and State of Massachusetts, have invented an Improvement in Surveying Instruments, of which the following description, in connection with the accompanying drawings, is a specification, like letters on the drawings representing like parts.

My invention is a new surveying instrument, having for its object the provision of means for expeditiously and accurately surveying by means of photography.

It is well known that photography is capable of extensive use as a method of surveying, especially in extended triangulation and other topographical surveying; but the inconvenient and unscientific mechanisms heretofore available for this purpose have rendered this field or method of surveying impractical. Surveying by photography has been accomplished by means of the ordinary camera, taken in connection with ordinary surveying instruments—such as transits, &c.—and when so practiced it has been necessary for the surveyor carefully to note at each station or each time he sets up his camera the precise conditions under which the particular views were taken. For example, in such practice it has been necessary for the operator to note with extreme accuracy the adjustments vertically and horizontally, as well as longitudinally, of the lens from the plate and also the precise position of the latter relatively to the bellows, &c., of the camera. Then when the data of the surveying came to be developed later on all these conditions have had to be taken into account in order to determine with any degree of accuracy the results of the survey, and, as will be readily understood by the profession, these various matters have rendered the problems exceedingly difficult and complicated. My present invention therefore aims to overcome all these objections and provides a camera-transit or camera surveying instrument by means of which surveying by photography or by the aid of photography is rendered as simple and direct as surveying by any other means, and, moreover, my invention greatly enlarges the practicability of this branch of surveying.

The details of my invention will be pointed out and more fully understood in the course of the following description, reference being had to the accompanying drawings, illustrative of a preferred embodiment of my invention, and the invention itself will be more particularly defined in the appended claims, also forming a part of this specification.

In the drawings, Figure 1 is a view in side elevation of one embodiment of my invention, parts thereof being broken away for convenience and clearness of illustration. Fig. 2 is a rear end elevation thereof looking toward the right, Fig. 1. Fig. 3 is a front elevation thereof looking toward the left. Fig. 4 is a vertical cross-section taken on the line 4 4, Fig. 1. Fig. 5 is a central vertical longitudinal section on the line 5 5, Fig. 2. Fig. 5$^a$ is a fragmentary sectional view of the inner end of an eyepiece, to be explained. Fig. 6 is an end elevation of the striding level. Fig. 7 is a fragmentary view, in side elevation, showing a modification. Fig. 8 is a vertical transverse section of a special plate-holder. Fig. 9 is a section on the line 9 9, Fig. 3.

On a suitable tripod or other support A, which may be of any usual or preferred construction, I mount a base plate or ring $a$, adjustably connected thereto, as herein shown, by a ball $a'$ and socket $a^2$, said ball being on the upper end of a stud $a^3$, having threaded connection at $a^4$ with a seat $a^5$, fixed in the head $a^6$ of the tripod, this stud having a thumb-nut $a^7$ for vertical adjustment, and the ring $a$ having three or four usual seats $a^8$ for usual adjusting-screws $a^9$, such as are found in surveying instruments in general. By this construction all the adjustments, including the ball-and-socket connection of the base, are in position where they can be seen and manipulated readily and with certainty, this being especially desirable with the instrument to be described, for the reason that it is larger and the conditions more peculiar than the usual surveying instrument.

On the base $a$ I mount a table B, herein shown as compounded of two plates $b$ $b'$, which supports the body C of the camera proper and is provided with a clamp $b^2$ and clamp-screw $b^3$ for quickly clamping or loosening the table, so that it may be adjusted roughly in a horizontal plane, and with a slowmotion screw $b^4$ for accurately adjusting the plate $b$ on the plate $b'$, one of said plates being provided along its edge with a graduated circle, as is clearly shown and will be readily understood without further explanation.

The table B carries at its forward end, as herein shown, a Y or Y's D, preferably considerably elongated in order properly to balance the camera proper and being shown as supporting the latter at or adjacent its extreme corner, adjusting-screws $d$ being provided for the body of the camera to rest against in order to give extreme nicety of adjustment to place the camera truly horizontal in the Y's. Preferably the table B carries longitudinal and transverse spirit-levels $d'$ and $b^5$. On the Y's is mounted the camera-body C, which is rigid and preferably made of metal, such as aluminium, for strength and lightness, this body tapering down from a rectangular shape at its rear end (see Figs. 1 and 2) to a cylindrical shape at its forward portion, or at least having truly cylindrical portions resting on the Y's. Within this body intermediate its ends I fix a wall or partition $c$ centrally perforated and on which is mounted the lens-holder $c'$ and lenses, which may be such as are usually found in cameras. The body also preferably extends forward, as indicated at $c^2$, in order to cut off all extraneous light from the lens, excepting that which is required for the purposes in hand. The camera-body is provided with a clamping-ring $c^3$, normally clamped immovably on the body by a thumb-screw $c^4$, this ring having at its lower portion a depending lug $c^5$, Fig. 4, engaged on either side by adjusting-screws $c^6$ $c^7$ for accurately rotating the camera-body as required in use to bring the bubbles of the levels to their centers, being normally held in clamped adjustment by means of a thumb-nut $c^8$, threaded on a stud $c^9$, depending from the lug $c^5$, said nut bearing against a spring $d^2$, secured on a yoke $d^3$ of the Y D. At its rear end the camera-body has an opening, as indicated at $c^{10}$, to receive a suitable plate-holder, which is clamped in place by a frame $c^{11}$, carried on a spider $c^{12}$ and accurately adjustable out and in with a movement in perfect parallelism with itself by means of a collar $c^{13}$, threaded at $c^{14}$, (see Fig. 5,) to be engaged by an external thumb-nut $c^{15}$, held to freely rotate by clips $c^{16}$, fast on a flanged sleeve $c^{17}$, said sleeve being held adjustably in place by capstan-screws $c^{18}$ in a stationary ring $c^{19}$, held rigidly by a spider $c^{20}$, fast on the camera-body.

By means of the mechanism last described not only is it made certain that the photographic plate will be clamped in one unvarying plane relatively to the axis of the camera, but a sliding adjustment is provided which is of material advantage in the practical use of the instrument, as will presently be more fully explained.

At diametrically opposite points on a suitable support—such, for instance, as the plate-holder—immediately adjacent to the plane which the photographic plate occupies in use I provide four small lugs $c^{21}$ $c^{22}$, the former corresponding to the horizontal cross-wires of a transit and the latter corresponding to the vertical cross-wires. Each of these small lugs is provided with a fine slit and hole, as will be clearly evident viewing Fig. 2, so that when the photograph is taken the base-line or horizontal line of the picture will be determined with absolute accuracy by the fine black lines which are photographed through these slits of the lugs $c^{21}$, and the prime vertical of the picture will be determined with similar accuracy by connecting the fine black lines photographed through the slits of the lugs $c^{22}$, the intersection of these lines on the picture giving with absolute precision the line of sight, as indicated at $c^{23}$, Fig. 2, and being in exact axial line with the center of the lens. A further feature of this part of my invention resides in making these small lugs $c^{21}$ $c^{22}$ or any one of them of a width exactly proportional to the length of any desired denomination on the surveyor's rod. For instance, I preferably give them each such a width that their width photographed on the plate will indicate the one-hundredth of the focal length of the objective simultaneously with the photograph of the usual surveyor's rod at any distance from the camera. By this means, as will be evident, any distance of the surveyor's rod from the camera may be determined by a simple proportion from the relative length of the surveyor's rod photographed on the plate. The body C of the instrument is also preferably capable of being taken apart, as indicated at $c^{24}$ and $c^{25}$, in order to adapt it to greater compactness in transportation, although it will be understood that normally the instrument will be adjusted to one fixed position and maintained there fixedly. At the top of the lens $c^3$ I provide means, shown as a pair of posts $c^{26}$, (see Fig. 4,) for assisting in maintaining a striding level and compass in temporary position resting on the instrument, as shown in Fig. 1. This comprises a level $c^{27}$ and a box $c^{28}$, containing a compass, and is provided at its ends with laterally-projecting legs $c^{29}$ $c^{30}$, which straddle the cylindrical body a sufficient distance in order to properly aline the members $c^{27}$ $c^{28}$ with the longitudinal axis of the instrument. The striding level is provided at either or both of its legs with adjusting-screws $c^{31}$. (See Fig. 6.) The body C is provided with levels $c^{32}$ $c^{33}$ for determining accurately the horizontal position of the slits as the body is rotated on its longitudinal axis. At its forward end I have shown the camera-body as provided with an attachment E for enabling the surveyor to get his bearings by means of the sun or a star, this attachment being shown as comprising a pair of arms $e$, projecting at either side of an annular plate $e'$, adjustably mounted by thumb-screws $e^2$ on a ring $e^3$, arranged to be adjusted by means of opposite set-screws $e^4$ $e^5$, bearing against a fixed lug $e^6$, this ring traveling on a flange $e^7$, screwed onto the front end of the camera-body. At their forward ends the arms $e$ carry pillow-blocks $e^8$, one of which is adjustable back and forth in its arm by means of a screw $e^9$. These blocks have V-rests in their upper surfaces to receive the trunnions $e^{10}$ of a plane mirror $e^{12}$, readily removable. From this description it will be understood that the position of the mirror $e^{12}$ may be accurately changed to any adjustment simply by moving one of its sides in or out by means of the set-screw $e^9$, or by tipping the annular plate $e'$ in any direction desired by means of the several thumb-screws $e^2$, or by revolving the ring $e^3$ slightly one way or the other by means of the opposite adjusting-screws $e^4$ $e^5$. It will be understood that the lens or lenses at $c'$ will preferably be of the "universal" type capable of taking accurate photographs at varying distances.

Inasmuch as it is necessary or at least quite desirable in this work that the surveyor should be able not merely to take in the general scope and effect of the scene as a photographer does by throwing a cloth over his head and the plate-holder end of the camera, but should be able to sight with absolute precision any small object (like the graduations on a surveyor's rod) at any distance, I have provided a central cylindrical aperture in the form of the collar $c^{13}$, carried by the fixed spider $c^{20}$, in accurate alinement with the longitudinal and focal axes of the camera, and in connection with this aperture I provide, preferably, two eyepieces. One of these eyepieces is for service on all usual occasions and the other is used for distances of extreme range and greater accuracy. Inasmuch, however, as the lenses of these eyepieces are in general the same as are found in all surveying-telescopes, I have not illustrated them in detail, but have indicated one of the eyepieces in place in Figs. 1 and 5, where it will be seen that it comprises a tube G, fitting accurately in the central aperture and preferably capable of being slid forward and backward therein by the hand for approximate focusing thereof, the more accurate focusing thereof being accomplished by moving the tube back and forth by means of the hand-nut $c^{15}$. The other eyepiece is special in certain respects, and accordingly I have presented a fragmentary view of it in Fig. 5$^a$, where it will be seen to comprise a tube G', the same as the tube G, before mentioned, this tube being offset at $g$ in order to accommodate the capstan-screws $g'$, which support a reticule-frame $g^2$, containing stadia or other reticule-wires $g^3$, the object of this eyepiece G' being for angle or stadia surveying, such as is well known in surveyor's work. By this means it will be understood that the stadia-wires may be shifted in the eyepiece G' for distant surveying thereby and that the focusing of this eyepiece may be accurately accomplished by the hand-nut $c^{15}$, it being also understood that the true optical axis of the eyepiece and of the instrument proper may be collimated by shifting the sleeve $c^{17}$ by means of the capstan-screws $c^{18}$.

In order to correct the apparatus and properly center the optical axis of the lens at $c'$ whenever the instrument is rotated on the Y's, I have given the lens-holder $c'$ a special adjustment, as shown in detail in Fig. 9, where it will be seen that the partition $c$ is provided with a spheroidal socket $c^{34}$, in which a ball-like member $c^{35}$ is seated, being held therein by means of adjusting-screws $c^{36}$, having threaded connection with the partition $c$, steadying-screws $c^{37}$, Fig. 3, being also provided adjacent the adjusting-screws, said steadying-screws bearing against the partition in order to insure the accuracy and permit adjustment of the objective.

In connection with the sighting features of my invention I employ a special plate-holder having a ground-glass $h$ and one or two bind-screens $h'$, centrally perforated at $h^2$ to coincide with the aperture at $c^{13}$ and supported in usual manner in a usual plate-holder frame $h^3$, so that the range of the picture desired is ascertained roughly simply by looking through the aperture at $c^{13}$ against the ground glass $h$, or when greater accuracy is required or for other reasons it is necessary or desirable to employ the eyepieces the screens $h'$ effectually cut off extraneous light and permit the desired results to be attained.

For the purpose of enabling the operator to photograph the entire horizon with or without overlapping the successive pictures I provide the plate $b'$ with a series of coarse notches, as indicated at $n$, these notches being spaced apart the exact distance corresponding to the angle included by the picture taken between the lugs $c^{21}$ $c^{21}$ and a second set of smaller notches $n'$, exactly corresponding to the angle of vision between the lugs $c^{22}$ $c^{22}$, when it is desired to reverse the camera-body and employ the normally vertical line $c^{22}$ as the horizon-line instead of the normal horizon-line $c^{21}$, these notches being readable with reference to an indicator $n^2$.

In Fig. 7 I have shown the Y D as pivotally mounted at $d^4$ on standards $d^5$, projecting upward from the support A in order to permit the camera to be tilted endwise, if desired, and I desire to state at this point that I have purposely omitted from Fig. 1 and the other figures of the drawings all details—such as a vertical circle, &c.—which may be used in connection with my invention, it being my purpose herein merely to show and describe those features which I consider to be novel, although I wish it understood that in connection with the novel features of construction herein set forth I intend to employ any devices and features of construction at present found in surveying instruments.

I will now describe the operation of my invention, and, first, I wish to state that inasmuch as the principles of surveying by photography are well known I do not deem it necessary to explain herein the theoretical principles involved, but shall confine myself simply to setting forth the manipulation of my instrument necessary for attaining the results desired. Having set up the tripod or other support on a hill or other station, the camera will be swung horizontally on the ring $a$ to the general direction desired and will then be clamped in place by the tightening-screw $b^3$, or if it is desired to use the points of the compass as data the finder $c^{28}$ is placed on the camera-body and the plates $b$ $b'$ at zero are swung horizontally until the compass-needle indicates that the instrument is alined with the magnetic meridian, whereupon the plate $b'$ is clamped rigidly in place by means of the screw $b^3$, and then the plate $b$ is adjusted to any angle required for the picture, the angle being read from the graduated horizontal circle. If the instrument-body does not happen to be in proper axial position, the other screw $c^4$ is loosened and the instrument is rotated until the bubble in the level $c^{32}$ is approximately centered, whereupon the screw $c^4$ is tightened, so as to clamp the body C and ring $c^3$ together, and then the more accurate adjustment is obtained by means of the thumb-screws $c^6$ $c^7$, operating against the lug $c^5$, it being understood that the nut $c^8$ is slightly loosened to permit this adjustment, or if it is desired to take the photographs with their narrower width in the horizon the body C is rotated in the ring $c^3$, so as to bring the level $c^{33}$ into horizontal position, and the adjustments are then made as before. The horizontal circle $b'$ and the plane including the longitudinal axis of the camera and the horizon-line of the plate may be brought into accurate parallelism by means of the several adjustments and observing the levels $b^5$ $d'$ $c^{32}$ $c^{27}$. If it becomes necessary to correct or ascertain the datum-line by the observation of a star or the sun, this may be done by adjusting the mirror $e^{12}$ by the means already explained until it casts a ray of light through the camera in exact coincidence with the optical axis of the lens, this being determined by means of the line of sight $c^{23}$. When now it is desired to take a picture, all that is necessary is to remove the special or sighting plate-holder from the camera and insert a usual plate-holder, containing the sensitive plates, which is clamped in place by the frame $c^{11}$. The construction as already explained is such that the plate is bound to be in absolutely correct position perpendicular to the axial line of the camera-body. The exposure having been made and the plate developed, it will be found that the four lugs $c^{21}$ $c^{22}$ are accurately photographed on the plate to be reproduced therefrom in the print. The impressions of these lugs give with absolute certainty the horizon-lines and prime vertical of each picture, their intersecting point giving the line of sight from which to measure all the data of the successive pictures according to the practice of topography or other system of surveying by means of which the mathematical results are ascertained. Inasmuch as the object-lens is invariably a given distance from the sensitive plate during any one series of operations and inasmuch as my instrument insures absolute accuracy and uniformity in all the pictures wherever and whenever taken it will be evident that the surveying may proceed with extreme facility and without the uncertainty and aggravating perplexities which have invariably existed in this branch of surveying as heretofore pursued.

I deem it unnecessary herein to explain further details of operation and capability of my invention, many of which have already been alluded to in the description of construction and others of which will be obvious to those skilled in the art.

Various changes and substitutions in details of arrangement and combination may be resorted to within the spirit and scope of my invention, and accordingly I wish it understood that I am not otherwise limited in matters of construction than as hereinafter expressed in the claims.

Having described my invention, what I claim, and desire to secure by Letters Patent, is—

1. A camera surveying instrument comprising a support, a table thereon, means to tilt said table for proper horizontal alinement, Y's carried by said table, a rigid camera-body supported in said Y's, means to rotate said body in said Y's, said body being provided with a wall immovable relatively to the body, an object-lens supported thereby, said body extending rigidly back from said lens and being provided at its rear end with plate-receiving mechanism for holding a sensitive plate accurately at a fixed unvarying distance from the lens and in proper central alinement with the axis thereof, substantially as described.

2. In a surveying-camera, a support, Y's carried thereby, a cylindrical camera-body held in said Y's and axially rotatable therein, means to adjust said body in said rotative movement, and means to clamp said body in its adjustment, substantially as described.

3. In a surveying-camera, a support, Y's carried thereby, a cylindrical camera-body held in said Y's and axially rotatable therein, a clamping-ring loosely engaging said body, means to immovably clamp said ring on said body, and means for removably fastening said ring to said Y's, substantially as described.

4. In a surveying-camera, a support, Y's carried thereby, a cylindrical camera-body held in said Y's and axially rotatable therein, a clamping-ring loosely engaging said body, means to immovably clamp said ring on said body, said ring having a lug projecting adjacent said Y's, and said Y's being provided with means for engaging said lug and moving it one way or the other to rotate the camera-body axially, substantially as described.

5. In a surveying-camera, a support, Y's carried thereby, a cylindrical camera-body held in said Y's and axially rotatable therein, a clamping-ring loosely engaging said body, means to immovably clamp said ring on said body, said ring having a lug projecting adjacent said Y's, and said Y's being provided with means for engaging said lug and moving it one way or the other to rotate the camera-body axially, said lug having a threaded stud extending through the Y-support, and a thumb-nut engaging the same for fixing the camera-body in its adjustment, substantially as described.

6. In a surveying-camera, a camera-body, and means to adjust a photographic plate relatively thereto for receiving an impression, said camera-body carrying adjacent the plane of said plate diametrically opposite portions provided with slits in exact alinement with the line of sight or optical axis of the camera-body, for determining the horizon-line of the pictures, substantially as described.

7. In a surveying-camera, a camera-body, and means to adjust a photographic plate relatively thereto for receiving an impression, said camera-body carrying adjacent the plane of said plate diametrically opposite portions provided with slits in exact alinement with the line of sight or longitudinal axis of the camera-body, for determining the horizon-line of the pictures, and other slits at right angles to said horizon-slits, for determining the prime vertical of the pictures, substantially as described.

8. In a surveying-camera, a lug projecting in front of and adjacent the plane of the photographic plate, said lug having a width bearing a definite proportion to a fixed standard for determining distances by comparison with said fixed standard, substantially as described.

9. In a surveying-camera, means to clamp a plate-holder in operative position in the camera, said means comprising a ring held fixedly slightly back of the recess for receiving the plate-holder, a frame movable forward and backward relatively to the camera and adapted to engage and clamp the plate-holder, said frame being moved in its adjustments by a collar supported centrally within said ring, and means carried by said ring and engaging said collar for adjusting it and said clamp in and out as required, said collar having a central sight-aperture, substantially as described.

10. In a surveying-camera, means to clamp a plate-holder in operative position in the camera, said means comprising a ring held fixedly slightly back of the recess for receiving the plate-holder, a frame movable forward and backward relatively to the camera and adapted to engage and clamp the plate-holder, said frame being moved in its adjustments by a collar supported centrally within said ring, and means carried by said ring and engaging said collar for adjusting it and said clamp in and out as required, said collar having a central sight-aperture, and a telescopic eyepiece adapted to telescope within said sight-opening, substantially as described.

11. In a surveying-camera, a camera-body adapted to be turned about its optical axis and having a rectangular end opening adapted to receive an ordinary plate-holder, a table carrying said body, and a support for said table, said table being horizontally rotatable relatively to said support, and being composed of two plates rotatable relatively to each other, one of said plates having a series of notches $n$ spaced apart to correspond to the angle included by the length or longer dimension of the picture adapted to be taken by the camera, and also having a series of notches $n'$ spaced apart to correspond to the angle included by the width or shorter dimension of the picture adapted to be taken by the camera, substantially as described.

12. The combination with a cylindrical tubular body, of posts at the upper side thereof and fixed thereto and a striding level having at opposite ends supported legs adapted to straddle the tubular body, the legs at one end of the striding level being provided with screws passing through the same, said striding level being retained on top of said body by said posts and carrying a compass.

13. In a surveying-camera, the combination with a support, a camera-body thereon, an eyepiece, and an object-lens carried by said camera, said lens maintaining a desired unvarying focal distance from the plane of the sensitized plate, of a mirror supported by the camera in front of said lens, and means for adjusting one edge of said mirror up or down relatively to the axis of the lens, and means for adjusting the mirror toward and from said lens.

14. In an instrument of the class described, the combination with a camera, of a mirror attachment comprising a ring rotatively mounted at the front of the camera, an annular plate adjustably mounted on said ring, arms projecting from said plate, and a mirror carried by said arms, substantially as described.

15. In an instrument of the class described, the combination with a camera having an eyepiece and object-lens, of a mirror attachment comprising a ring rotatively mounted at the front of the camera and adjustable axially and rotatably thereof, arms carried by said ring and projecting from said camera, horizontal bearings in said arms, one of said bearings being adjustable longitudinally of the arm, and a mirror supported in said bearings, substantially as described.

16. The herein-described ground-glass frame for a surveying-camera, comprising a frame, an opaque screen therein, and a central aperture in said screen for sighting through in range-finding, substantially as described.

17. The herein-described ground-glass frame for a surveying-camera, comprising a frame, an opaque screen therein, a central aperture in said screen, and a ground glass carried by the frame covering said aperture, substantially as described.

18. The combination with a tripod or support, of Y's carried thereon, and a camera resting in said Y's, said camera having a rigid body provided with truly-cylindrical portions at the Y's, whereby it may be rotated without varying the position of its longitudinal axis, substantially as described.

19. In a surveying-camera, a support, a camera carried by said support, said camera containing means to indicate automatically on the photograph the proper positions of the horizon-line and the prime vertical, an objective carried by said camera, and means for adjusting the objective to collimate the optical axis thereof with the intersection of said horizon-line and prime vertical, substantially as described.

20. A surveying-camera having at its rear end a central sleeve, an eyepiece for angle surveying, said eyepiece being adjustable in said sleeve and containing a reticule, and means for adjusting the reticule in the eyepiece, substantially as described.

In testimony whereof I have signed my name to this specification in the presence of two subscribing witnesses.

CHRISTIAN L. BERGER.

Witnesses:
GEO. H. MAXWELL,
GEO. W. GREGORY.